United States Patent
Jiang et al.

(10) Patent No.: US 10,555,242 B2
(45) Date of Patent: Feb. 4, 2020

(54) CELL-SELECTIVE NETWORK ACCESS (75) Inventors: Hai Jiang, Beijing (CN); Jian Feng Kang, Beijing (CN); Xiao Yi Wang, Beijing (CN); Chao Wei, Beijing (CN); Yi Wu, Beijing (CN); Dong Mei Zhang, Beijing (CN)

(73) Assignee: HMD Global Oy, Espoo (FI)

( * ) Notice: Subject to any disclaimer, the term of this patent is extended or adjusted under 35 U.S.C. 154(b) by 680 days.

(21) Appl. No.: 12/996,033

(22) PCT Filed: Jun. 6, 2008

(86) PCT No.: PCT/EP2008/004543
§ 371 (c)(1),
(2), (4) Date: Dec. 3, 2010

(87) PCT Pub. No.: WO2009/146725
PCT Pub. Date: Dec. 10, 2009

(65) Prior Publication Data
US 2011/0080863 A1   Apr. 7, 2011

(51) Int. Cl.
*H04W 4/06* (2009.01)
*H04W 48/10* (2009.01)
*H04W 48/20* (2009.01)
*H04W 16/32* (2009.01)
*H04W 72/00* (2009.01)

(52) U.S. Cl.
CPC ........... *H04W 48/10* (2013.01); *H04W 16/32* (2013.01); *H04W 48/20* (2013.01); *H04W 72/005* (2013.01)

(58) Field of Classification Search
USPC ............... 370/328, 338, 331, 332, 312, 432; 455/436, 435, 437–438
See application file for complete search history.

(56) References Cited

U.S. PATENT DOCUMENTS

| | | | |
|---|---|---|---|
| 6,628,946 B1 * | 9/2003 | Wiberg et al. | 455/434 |
| 7,634,272 B2 * | 12/2009 | Yamashita et al. | 455/444 |
| 7,769,381 B2 * | 8/2010 | Mohammed et al. | 455/435.2 |
| 8,169,992 B2 * | 5/2012 | Parkvall et al. | 370/342 |
| 8,311,030 B2 * | 11/2012 | Thakare | 370/350 |

(Continued)

FOREIGN PATENT DOCUMENTS

| | | | |
|---|---|---|---|
| CN | 1498017 A | 5/2004 | |
| CN | 1593071 A | 3/2005 | |

(Continued)

OTHER PUBLICATIONS

Japanese Search Report for corresponding Japanese Patent Application No. 2011-511979 dated Feb. 16, 2012.

(Continued)

*Primary Examiner* — Candal Elpenord
(74) *Attorney, Agent, or Firm* — Harrington & Smith (57) ABSTRACT

The present invention relates to methods and apparatuses for providing selective network access, wherein a cell type indication is provided based on at least one of a preamble and a header portion of a broadcast signal. At the receiving end, it is checked based on at least one of the preamble and the header portion, whether broadcast signals are received from different first and second cell types. The first cell type is selected for network access, if both broadcast signals from the first and second cell types are received with sufficient strength.

25 Claims, 5 Drawing Sheets

(56) References Cited

U.S. PATENT DOCUMENTS

| | | | |
|---|---|---|---|
| 8,385,293 B2* | 2/2013 | Rajasimman et al. | 370/332 |
| 2003/0013452 A1 | 6/2003 | Hunt et al. | |
| 2005/0030924 A1* | 2/2005 | Yano et al. | 370/332 |
| 2005/0037798 A1 | 2/2005 | Yamashita et al. | |
| 2005/0250502 A1 | 11/2005 | Laroia et al. | 455/447 |
| 2006/0215609 A1 | 9/2006 | Kyung et al. | |
| 2006/0291425 A1* | 12/2006 | Park et al. | 370/331 |
| 2007/0025297 A1* | 2/2007 | Lee | H04W 36/0066 370/331 |
| 2007/0140185 A1* | 6/2007 | Garg et al. | 370/338 |
| 2008/0132239 A1 | 6/2008 | Khetawat et al. | 455/438 |
| 2008/0219216 A1 | 9/2008 | Taaghol et al. | 370/331 |
| 2008/0267153 A1 | 10/2008 | Mukherjee | |
| 2009/0052395 A1* | 2/2009 | Bao et al. | 370/331 |
| 2009/0132674 A1 | 5/2009 | Horn et al. | |
| 2009/0132675 A1* | 5/2009 | Horn | H04W 8/26 709/207 |
| 2009/0135803 A1 | 5/2009 | Luo | |
| 2009/0285113 A1* | 11/2009 | Yavuz et al. | 370/252 |
| 2009/0310565 A1* | 12/2009 | Huo | H04W 24/02 370/331 |
| 2015/0140993 A1 | 5/2015 | Horn et al. | |

FOREIGN PATENT DOCUMENTS

| | | |
|---|---|---|
| CN | 1839613 A | 9/2006 |
| EP | 1 411 741 A1 | 4/2004 |
| EP | 1 876 764 A1 | 1/2008 |
| JP | H0951571 A | 2/1997 |
| JP | H10-13908 A | 1/1998 |
| JP | H11-177522 A | 7/1999 |
| JP | 2002537740 A | 11/2002 |
| JP | 2002537741 A | 11/2002 |
| JP | 2004-159304 A | 6/2004 |
| JP | 2004260262 A | 9/2004 |
| JP | 2007-43376 A | 2/2007 |
| JP | 2008-17317 A | 1/2008 |
| JP | 2008008404 A | 1/2008 |
| RU | 2321970 C2 | 4/2008 |
| RU | 2371885 C2 | 10/2009 |
| WO | WO 2005/025092 A1 | 3/2005 |
| WO | WO 2005/043866 A1 | 5/2005 |
| WO | WO 2005/078966 A1 | 8/2005 |
| WO | WO 2007/147146 A2 | 12/2007 |

OTHER PUBLICATIONS

Institute of Electrical and Electronics Engineers (IEEE) Standard for Local and metropolitan area networks Part 16: Air Interface for Fixed and Mobile Broadband Wireless Access Systems Amendment 2: Physical and Medium Control Layers for Combined Fixed and Mobile Operation in Licensed Bands, IEEE Std 802.16e-2005 and IEEE Std 802.16-2004/Cor1-2005. (Feb. 28, 2006), 864 pages.

* cited by examiner

| Syntax | Size (bit) | Notes |
|---|---|---|
| DL_Frame_Prefix_Format() { | - | - |
| Used subchannel bitmap | 6 | Bit #1: Subchannel group 0<br>Bit #2: Subchannel group 1<br>Bit #3: Subchannel group 2<br>Bit #4: Subchannel group 3<br>Bit #5: Subchannel group 4<br>Bit #6: Subchannel group 5 |
| Femto flag | 1 | "1": femto BS<br>"0": macro BS |
| Repetition_Coding_Indication | 2 | "00": No repetition coding on DL-MAP<br>"01": Repetition coding of 2 used on DL-MAP<br>"10": Repetition coding of 4 used on DL-MAP<br>"11": Repetition coding of 6 used on DL-MAP |
| Coding_Indication | 3 | "000": CC encoding used on DL-MAP<br>"001": BTC encoding used on DL-MAP<br>"010": CTC encoding used on DL-MAP<br>"011": ZZ CC encoding used on DL-MAP<br>"100": CC encoding with operational interleaver<br>"101": LDPC encoding used on DL-MAP<br>"110", "111": *Reserved* |
| DL-MAP_Length | 8 | - |
| *Reserved* | 4 | Shall be set to zero |
| } | | |

CELL-SELECTIVE NETWORK ACCESS

FIELD

Embodiments of the present invention relate to a method and apparatuses for providing access to a wireless network, such as—but not limited to—Universal Mobile Communication System (UMTS) or Long Term Evolution (LTE) networks or Mobile WiMAX (Worldwide Interoperability for Microwave Access).

BACKGROUND

Home base stations, home NodeBs, femto eNodeBs or any other type of home access device (in the following referred to as "HNB") have become a widely discussed topic within $3^{rd}$ Generation Partnership Project (3GPP) as well as in the operator and manufacturer community. When deployed in homes and offices, HNBs allow subscribers to use their existing handsets—in a building—with significantly improved coverage and increased broadband wireless performance. Moreover, Internet Protocol (IP) based architecture allows deployment and management in virtually any environment with broadband Internet service. Femto cells with HNBs thus enable small, low-cost cellular base stations aimed at improving indoor coverage, so that small cellular access points can be provided, that connect to a mobile operator's network using residential digital subscriber line (DSL) or cable broadband connections. The concept of femto cells is simple: making a base station cheap enough to be deployed in high volume for residential use, connected to the core network via broadband. This would deliver a subscriber the same service and benefit as a converged offering but, crucially, would use existing standard handsets, with no need to upgrade to expensive dual-mode devices.

In HNB scenarios, it is generally assumed that an end user is buying a cheap (Wireless Local Area Network (WLAN) like) product and also installs this physical entity at his home. Such a HNB would then provide coverage/service to the terminals registered by the owner of the HNB. Still the HNB would use the same spectrum owned by the operator and as such at least partly the spectrum the operator is using to provide macro cell coverage to the area where the HNB is located in.

Besides third generation (3G) mobile communication systems, the interest of femto cell also applies equally to emerging wireless broadband technologies such as WiMAX (Worldwide Interoperability for Microwave Access) and LTE.

A femto cell could provide mobile service to a terminal device (e.g. mobile station (MS) or user equipment (UE)) with high data throughput and better coverage if the terminal device is located within femto cell's coverage. Moreover, it is possible to have a specific pricing system for femto cells, which is different from that for macro cells depending on the operator's business model. For example, flat monthly payment for each femto cell at home or small office is possible.

SUMMARY

According to some embodiments, a suggested method at the receiving end comprises:
  receiving broadcast signals from a cellular network;
  checking based on a preamble or header portion of said broadcast signals whether said broadcast signals are received from different first and second cell types; and
  selecting said first cell type for network access, if both broadcast signals from said first and second cell types are received with sufficient strength.

Furthermore, another suggested method at the transmitting end comprises:
  providing a cell type indication based on a preamble or header portion of a broadcast signal; and
  transmitting said broadcast signal with a cell type indication set in accordance with a cell type of a cell from which said broadcast signal is transmitted.

Additionally, a suggested apparatus at the receiving end comprises:
  a receiver for receiving broadcast signals from a cellular network;
  a detector for checking based on a preamble or header portion of said broadcast signals whether said broadcast signals are received from different first and second cell types; and
  a selector for selecting said first cell type for network access, if both broadcast signals from said first and second cell types are received with sufficient strength.

Finally, a suggested apparatus at the transmitting end comprises:
  an indicator for providing cell type indication based on a preamble or header portion of a broadcast signal; and
  a transmitter for transmitting said broadcast signal with a cell type indication set in accordance with a cell type of a cell from which said broadcast signal is transmitted.

The above methods may be implemented as a computer program product comprising code means for producing the respective above steps when run on a computer device.

The above apparatuses may be implemented as network elements or nodes, access devices, fixed or mobile terminal devices, or as modules, chips or chip sets provided in these nodes, elements or devices.

Accordingly, it is proposed to differentiate different cell types by several ways, so that a terminal device can selectively access a cell type based on its preferences: While the terminal device initially accesses to the network, it can listen to the preamble and/or header broadcasted from an access device (e.g. base station (BS) or HNB). If the detected preamble signals are both strong enough from cell types, the terminal device can selectively access the desired first cell type (e.g. femto cell) rather than the second cell type (e.g. macro cell), so that it can enjoy certain benefits, e.g., pricing benefit, and/or high data rate. The proposed solution thus helps terminal devices to identify which is a desired cell type from a range of accessible cell types, since it can distinguish between broadcast signals of different cell types.

In a specific implementation example, the first cell type may have a cell size smaller than the second cell type. More specifically, the first cell type may be a femto cell and the second cell type is a macro cell. However, the present invention is not limited to such cell types, but can be used for differentiation of any cell types with different characteristics.

The checking may for example comprise detecting a predetermined cell type specific preamble or a predetermined cell type specific flag or a predetermined cell type specific header repetition. Thus, cell type indication can be provided by a predetermined cell type specific preamble or a predetermined cell type specific flag or a predetermined cell type specific header repetition pattern.

According to specific but non-limiting implementation example, the cell type specific preamble may be identified by a predetermined allocated preamble modulation series.

According to another specific but non-limiting implementation example, the header portion may be a frame control header and the cell type specific flag may be provided in the frame control header.

According to a further specific but non-limiting implementation example, the cell type specific header repetition may be performed with a frame control header.

According to a still further specific but non-limiting implementation example, the cell type specific header repetition may involve a predetermined polarity change.

Other advantageous modifications are defined in the dependent claims.

BRIEF DESCRIPTION OF THE DRAWINGS

The invention will now be described in greater detail based on exemplary embodiments with reference to the accompanying drawings in which.

DESCRIPTION OF THE EMBODIMENTS

In the following, embodiments of the present invention will be described based on an exemplary and non-limiting WiMAX network architecture.

Figure 1:
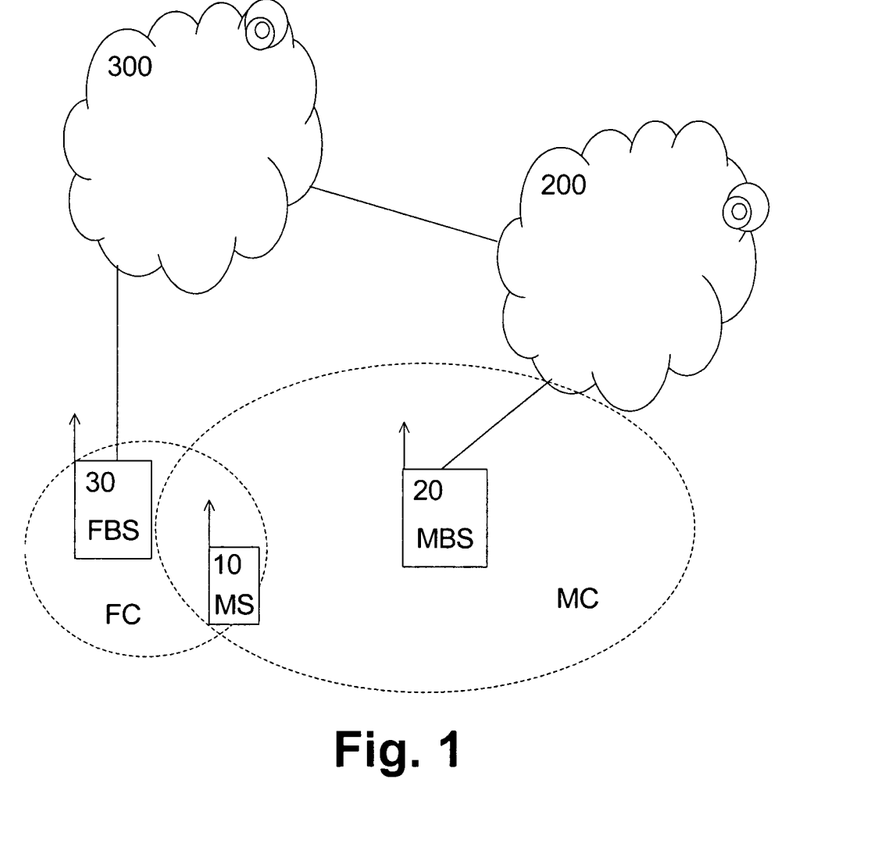
FIG. 1 shows a schematic network architecture in which the present invention can be implemented.

FIG. 1 shows a schematic network architecture with a femto BS (FBS) 30 and a macro BS (MBS) 20 according to an embodiment.

According to FIG. 1, in the home domain, the FBS 30 controls a small femto cell (FC) and the MBS 20 controls a larger conventional macro cell (MC). To achieve access to a fixed network (such as the Internet), the FBS 30 is connected in the WiMAX architecture to a first wireless network 300 (e.g. a wide area network (WAN) 300 via an xDSL modem and a DSLAM or any other type of wireless network. Furthermore, in the mobile operator's domain, the MBS 20 is connected to a second wireless network 200 (e.g. a mobile communication network (such as LTE) via an access serving network gateway (ASN-GW) (not shown) which may provide a link to the second network 300).

In the embodiment, the FBS 30 can be differentiated from the MBS 20 in several ways, as explained later. Thereby, a terminal device or MS 10 located within the coverage of both FC and MC could selectively access to the FBS 30. More specifically, the MS 10 initiates a network access. Meanwhile, the MS 10 may listen to at least one of a preamble and a header (e.g. frame control header (FCH)) of a signal broadcasted from the FBS 30 and/or MBS 20. If the detected preamble and/or header signals are both strong enough from both MBS 20 and FBS 30, the MS 10 could selectively access to the FBS 30 rather than to the MBS 20. Thereby the MS 10 could enjoy e.g. pricing benefit, and/or high data rate.

During handover, the same rule could be followed. Both FBS 30 and MBS 20 are available from a target BS list. Then, the MS 10 could handover to the FBS 30 instead of the MBS 20. The MS 10 could identify whether there is and which is the FBS 30.

For example, in FIG. 1, the MS 10 is located at a point which is covered by both MBS 20 and FBS 30. The MS 10 could then selectively access to the FBS 30 during initial access, handover and that the like. The MS 10 could identify that there is an FBS available with high data rate and low cost. If other policy based cell selection algorithm is deployed, the differentiation between FBS 30 and MBS 20 could help as well.

It is noted that the embodiment of FIG. 1 can be modified in various ways. The MBS 20 and the FBS 30 may be connected to the same network (e.g. WiMAX, LTE etc.) or to different networks in a manner different or opposite to FIG. 1.

Figure 2:
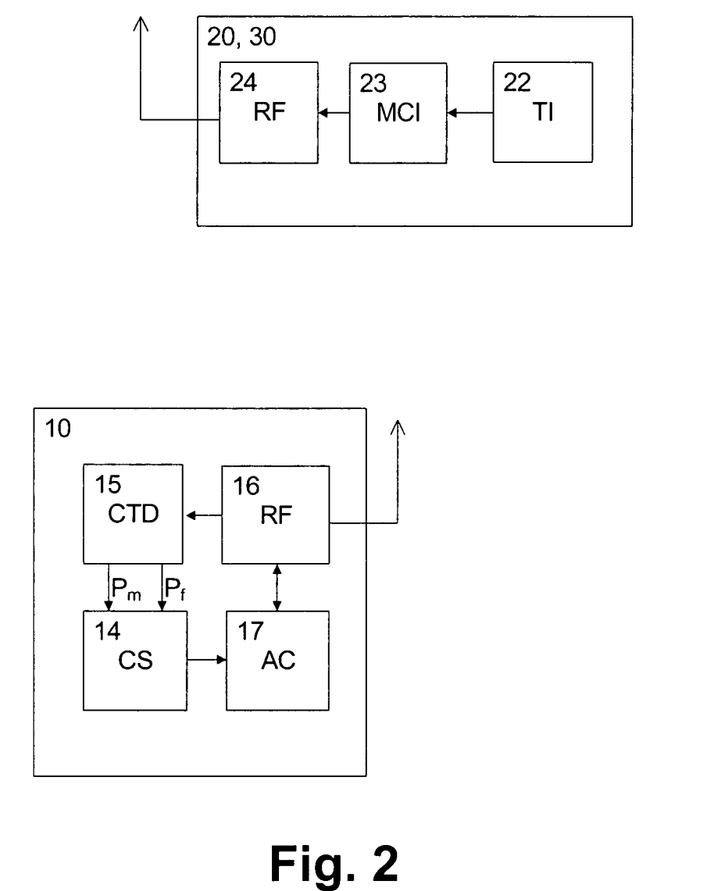
FIG. 2 shows a schematic block diagram of an access device and a terminal device according to an embodiment.

FIG. 2 shows a schematic block diagram of the MS 10 and the MBS 20 or FBS 30 according to an embodiment. It is noted that only those functionalities useful for understanding the present invention are depicted in FIG. 2.

At the MS 10, a received information is checked by a cell type detection (CTD) functionality or unit 15 for checking a header or preamble of a received broadcast signal to derive a cell type which has transmitted the received broadcast signal. The CTD functionality or unit 15 may be provided as a part of a radio resource control (RRC) functionality. RRC may control reception operation of a receiver part of a radio frequency (RF) front-end unit 16. The RF front-end unit 16 may enable wireless transmission and reception via an antenna. Based on the detected cell type, the CTD functionality or unit 15 may for example determine signal quality, power, or strength of the received cell type specific preamble or header. The CTD functionality or unit 15 may forward respective values or parameters $P_m$ and $P_f$ which may for example indicate the signal quality, power, or strength received from the MC and FC, respectively. Of course, other cell types may be discriminated as well.

Based at least on the parameters $P_m$ and $P_f$, a cell selection functionality or unit 14 may select a cell type, e.g. FBS 30 or MBS 20, to be used for network access, and may control an access controller or control unit 17 to initiate a corresponding control signaling for network access.

At the MBS 20 or FBS 30, a cell type information may be set in a type indicator or unit (TI) 22. The type indicator or unit (TI) 22 may be controlled in response to a corresponding control input. The control input could for example be supplied by the network operator or stored in a suitable memory device (not shown). Based at least on the cell type information, a header or preamble or transmission thereof in a broadcast signal may be modified in a message control information (MCI) functionality or unit 23 and may be transmitted via an RF front-end unit 24 and an antenna.

Figure 3:
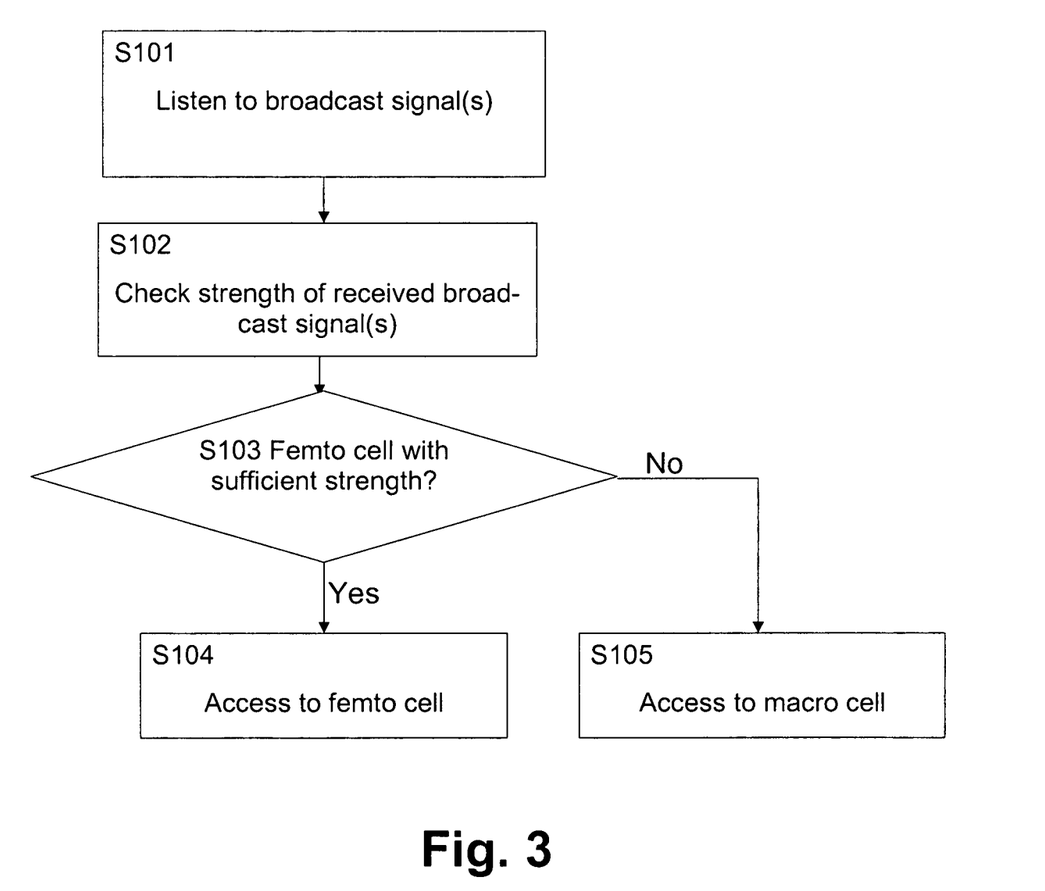
FIG. 3 shows a flow diagram of a selective access procedure according to an embodiment.

FIG. 3 shows a flow diagram of a receiving-side processing according to an embodiment of the present invention, which could be implemented based on a processing routine in the MS 10.

In step S101, the MS 10 listens to broadcast signal(s) received from access networks, e.g., from the FBS 30 or MBS 20. Then, in step S102, the cell type and strength (or quality or power etc.) is detected and it is decided in step S103 whether a FC signal is available at sufficient strength. If so, access to the FC is initiated in step S104. Otherwise, if it is decided in step S103 that no FC signal with sufficient strength (or quality or power etc.) is available, an access to the MC is initiated in step S105, if available.

In the following, example implementation options to distinguish different cell types (e.g. FBS 30 from MBS 20 or the like) are presented.

According to a first example implementation option, different preambles can be allocated to the FBS 30 and the MBS 20. In the WiMAX 802.16e standard, there are 114 preamble modulation series per segment and cell identity (Idcell) for the 1024-FFT (fast fourier transform) mode. Thus, a certain amount of preamble modulation series could be allocated to the FBS 30. The remaining preamble modulation series may then still be used for the MBS 20. As an example, preambles with IDcell={30, 31} and segment={0, 1, 2} could be allocated to the FBS 30. Once the MS 10 detects that the preamble series of the scanned BS belongs to the FBS category, it may know this BS is an FBS.

According to an another example implementation option, a flag in the frame control header (FCH) could be set to identify the FBS 30. A downlink frame prefix (DL_Frame_Prefix) is a data structure transmitted at the beginning of each frame and contains information regarding the current frame and is mapped to the FCH.

Figure 4:
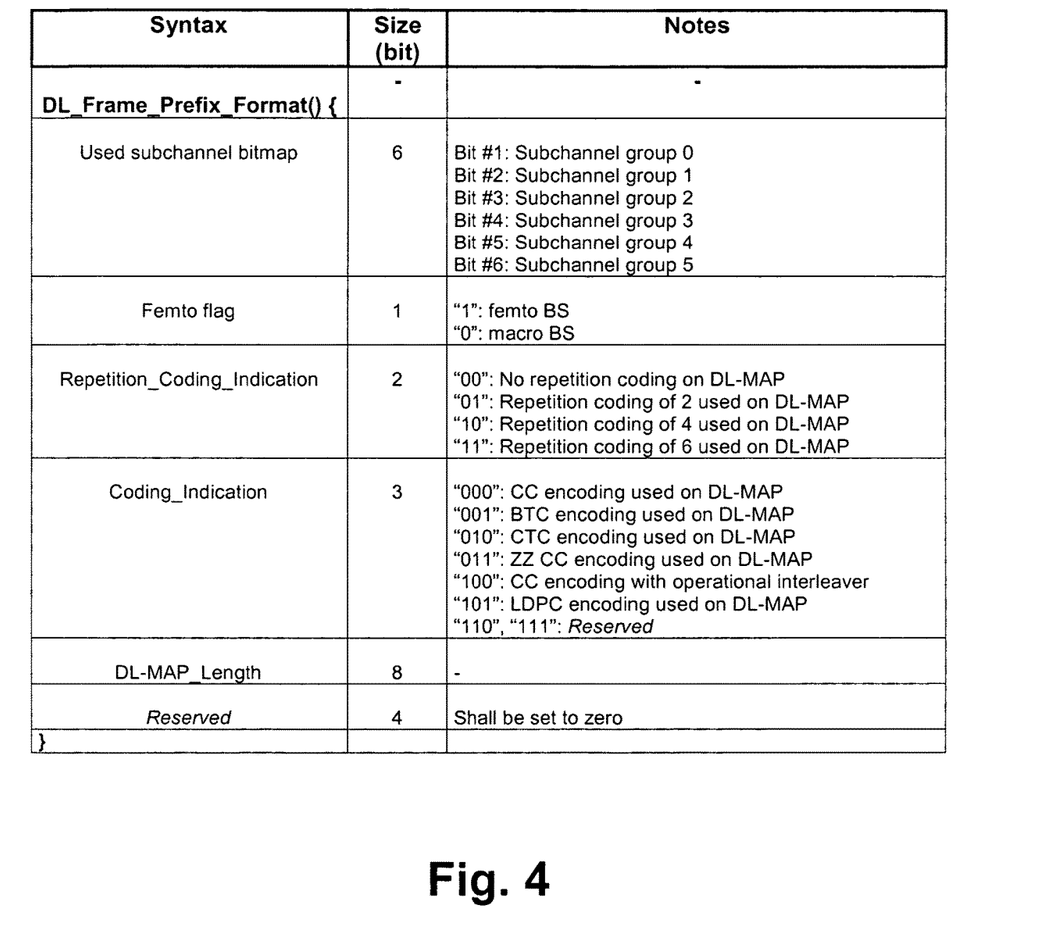
FIG. 4 shows a table indicating frame control header format according to an embodiment.

FIG. 4 shows a table indicating an exemplary structure of frame prefix format according to an embodiment, for all FFT sizes except 128. One reserved bit in the downlink frame prefix can be used as a femto flag to denote whether this BS is an FBS or not. If the femto flag is set to "1", the BS from which the received broadcast signal has been transmitted is an FBS. Otherwise the BS is an MBS, or vice versa.

It is apparent that other reserved bits of the frame prefix may be used as well for cell type indication or signaling.

After synchronization with a concerned BS, the MS 10 could identify whether this BS is an FBS or not, so that it could decide whether to access this BS based on its defined policy.

According to a yet another example implementation option, polarity switching may be employed in the FCH repetition. As an example, for FFT sizes other than 128, the first 4 slots in the downlink (DL) part of the segment contain the FCH. These slots are modulated by QPSK (quadrature phase shift keying) with coding rate ½ and repetition coding of 4. To add more information in the FCH, a polarized repetition is employed here.

As an example, for an MBS, the repetition form may be normally defined as [A A A A] according to the standard specification. On the other hand, for an FBS, the repetition form is proposed to be changed according to a predetermined polarity pattern. As an example, the pattern can be [A-A A-A], which indicates that the second and fourth parts or repetitions are inverted. Thus, at the MS end, the different repetition form could be clarified by correlation. This only adds little extra complexity.

Figure 5:
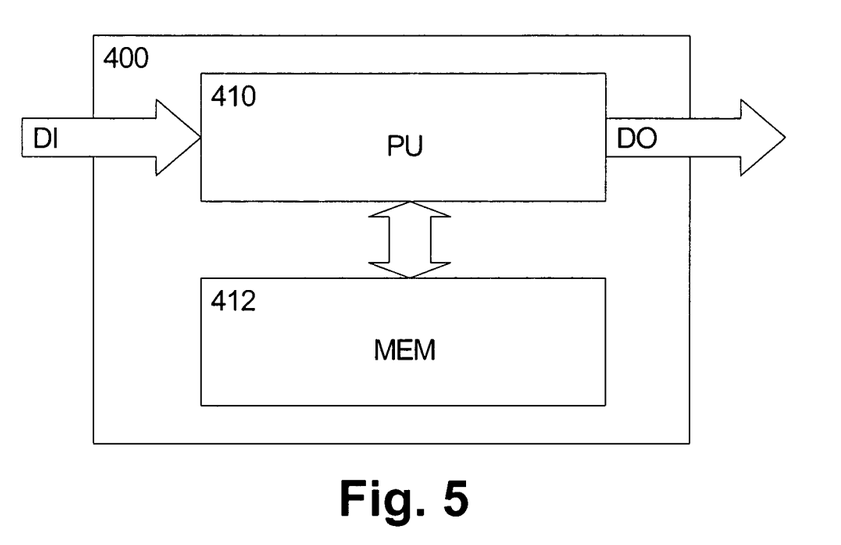
FIG. 5 shows a schematic block diagram of software-based implementation according to an embodiment.

FIG. 5 shows a schematic block diagram of an alternative software-based implementation according to an embodiment. The required functionalities can be implemented in any terminal or network entity (e.g. in the MS 10 or the MBS 20 or the FBS 30) with a processing unit 410. The processing unit 410 may be any processor or computer device with a control unit. The control unit may perform control based on software routines of a control program stored in a memory 412. The control program may also be stored separately on a computer-readable medium. Program code instructions are fetched from the memory 412 and may be loaded to the control unit of the processing unit 410 in order to perform the processing steps of the above device-specific functionalities which may be implemented as the above mentioned software routines. The processing steps may be performed on the basis of input data DI and may generate output data DO. In case of the MS 10, the input data DI may correspond to a received broadcast signal, and the output data DO may correspond to an access signaling for accessing the selected cell. In case of the MBS 20 or the FBS 30, the input data DI may correspond to a received cell type setting information, and the output data DO may correspond to the modified broadcast signal (e.g. header, preamble, or transmission pattern).

Consequently, the above embodiments of the MS 10, MBS 20, and FBS 30 may be implemented as a computer program product comprising code means for generating each individual step of the signaling procedures for the respective entity when run on a computer device or data processor of the respective entity.

In summary, methods and apparatuses for providing selective network access have been described, wherein a cell type indication is provided based on at least one of a preamble and a header portion of a broadcast signal. At the receiving end, it is checked based on at least one of the preamble and the header portion, whether broadcast signals are received from different first and second cell types. The first cell type is selected for network access, if both broadcast signals from the first and second cell types are received with sufficient strength.

It is apparent that the invention can easily be extended to any service and network environment and is not restricted to the LTE or Mobile WiMAX technology area and in particular not to MBSs and FBSs. The proposed embodiments and implementation options can be combined in all possible ways and can be implemented in connection with any base stations with different cell types deployed in a wireless network.

The embodiments may thus vary in that all or a combination of the above methods and techniques are used wherein a specific method, technique or algorithm may be used in accordance with the supported characteristics of the particular system. It is intended that the appended claims cover all such features and advantages of that fall within the scope of the appended claims. As numerous modifications and changes will readily occur to those skilled in the art, it is intended that scope not be limited to the limited number of embodiments described herein. Accordingly, all suitable variations, modifications, combinations and equivalents of the appended claim features are considered part of the scope.

The invention claimed is:

1. A method comprising:
   receiving broadcast signals from a cellular network;
   checking, based on at least one of a preamble and a header portion of said broadcast signals, whether said broadcast signals are received from different first and second cell types, wherein said first cell type is a femto cell and said second cell type is a macro cell;
   selecting based on said first cell type a cell having said first cell type for network access, if both broadcast signals from said first and second cell types are received with sufficient strength; and
   accessing, in response to the selecting, the cell having the first cell type.

2. The method according to claim 1, wherein said checking comprises detecting a predetermined cell type specific preamble or a predetermined cell type specific flag or a predetermined cell type specific header repetition pattern.

3. The method according to claim 2, wherein said cell type specific preamble is identified by a predetermined allocated preamble modulation series.

4. The method according to claim 2, wherein said cell type specific flag is provided in a frame control header.

5. The method according to claim 2, wherein said cell type specific header repetition is performed with a frame control header.

6. The method according to claim 2, wherein said cell type specific header repetition involves a predetermined polarity change.

7. The method of claim 1 wherein the checking is based only on the preamble and not the header.

8. The method of claim 1 wherein the checking is based only on the header and not the preamble.

9. The method of claim 7 wherein a first set of preambles is used to indicate a first cell type and a second set of preambles is used to indicate a second cell type.

10. The method of claim 1, wherein the checking further comprises checking, whether said broadcast signals are received from different first and second cell types corresponding to different cells having the different first and second cell types; and wherein selecting further comprises selecting said first cell type for network access, if both broadcast signals from said first and second cell types are received with sufficient strength, the sufficient strength indicating each of the different cells can provide network access to the mobile station.

11. The method of claim 1, wherein the checking is performed based only on the preamble, and wherein the preamble of said broadcast signals comprises a cell type specific preamble that is identified by a predetermined allocated preamble modulation series, wherein a first predetermined allocated preamble modulation series indicates a cell is of the first cell type and wherein a second, different predetermined allocated preamble modulation series indicates a cell is of the second cell type.

12. The method of claim 11, wherein a certain amount of a preamble modulation series is allocated to cells of the first cell type and wherein a remaining amount of the preamble modulation series is allocated to the cells of the second cell type.

13. The method of claim 11, wherein the checking is based on both of the preamble and the header portion of said broadcast signals being determined to be of sufficient strength.

14. An apparatus comprising one or more processors and one or more memories including computer program code, the one or more memories and the computer program code configured, with the one or more processors, to cause the apparatus to perform at least the following:
receiving broadcast signals from a cellular network;
based on a preamble or header portion of said broadcast signals, detecting whether said broadcast signals are received from different first and second cell types, wherein said first cell type is a femto cell and said second cell type is a macro cell;
selecting based on said first cell type a cell having said first cell type for network access, if both broadcast signals from said first and second cell types are received with sufficient strength; and
accessing, in response to the selecting, the cell having the first cell type.

15. The apparatus according to claim 14, wherein the computer program code is further configured, with the one or more processors, to cause the apparatus to detect a predetermined cell type specific preamble or a predetermined cell type specific flag or a predetermined cell type specific header repetition pattern.

16. A wireless terminal device comprising an apparatus according to claim 14.

17. A semiconductor chip module comprising an apparatus according to claim 14.

18. The apparatus of claim 14 wherein the preamble or header portion of said broadcast signals comprises a cell type specific preamble that is identified by a predetermined allocated preamble modulation series.

19. The apparatus of claim 14 wherein the preamble or header portion of said broadcast signals includes a cell type specific flag that is provided in a frame control header.

20. The apparatus of claim 14 wherein the computer program code is further configured, with the one or more processors, to cause the apparatus to perform cell type specific header repetition with a frame control header.

21. The apparatus of claim 20 wherein said cell type specific header repetition involves a predetermined polarity change.

22. The apparatus of claim 14, wherein the checking is performed based only on the preamble, and wherein the preamble of said broadcast signals comprises a cell type specific preamble that is identified by a predetermined allocated preamble modulation series, wherein a first predetermined allocated preamble modulation series indicates a cell is of the first cell type and wherein a second, different predetermined allocated preamble modulation series indicates a cell is of the second cell type.

23. The apparatus of claim 22, wherein a certain amount of a preamble modulation series is allocated to cells of the first cell type and wherein a remaining amount of the preamble modulation series is allocated to the cells of the second cell type.

24. The method of claim 22, wherein the checking is based on both of the preamble and the header portion of said broadcast signals being determined to be of sufficient strength.

25. A computer program product comprising a non-transitory computer readable storage medium on which instructions are stored for producing operations comprising the following when run on a computer device:
receiving broadcast signals from a cellular network;
checking, based on at least one of a preamble and a header portion of said broadcast signals, whether said broadcast signals are received from different first and second cell types, wherein said first cell type is a femto cell and said second cell type is a macro cell;
selecting based on said first cell type a cell having said first cell type for network access, if both broadcast signals from said first and second cell types are received with sufficient strength; and
accessing, in response to the selecting, the cell having the first cell type.

* * * * *